United States Patent [19]

Kucherovsky

[11] Patent Number: 5,693,416

[45] Date of Patent: Dec. 2, 1997

[54] METHOD OF MAKING A SPIRAL-WOUND TUBE, A TUBE MADE BY SUCH A METHOD, AND AN OUTER LAYER USED IN SUCH A TUBE

[76] Inventor: Joseph Kucherovsky, 9937 Wingtip Rd., Philadelphia, Pa. 19115

[21] Appl. No.: 575,132

[22] Filed: Dec. 19, 1995

[51] Int. Cl.⁶ .................... B32B 23/06; B32B 23/08; B32B 31/08

[52] U.S. Cl. .................. 428/332; 428/34.3; 428/424.6; 428/508; 428/510; 428/511; 428/520; 156/277

[58] Field of Search ...................... 428/507, 508, 428/511, 510, 513, 332, 34.2, 34.3, 424.6, 220, 423.1, 342, 520; 156/277, 324; 101/483

[56] References Cited

U.S. PATENT DOCUMENTS 4,254,173  3/1981  Peer, Jr. ........................ 428/507

4,859,513  8/1989  Gibbons et al. ................ 428/34.2

*Primary Examiner*—Rena Dye
*Attorney, Agent, or Firm*—Fitzpatrick, Cella, Harper & Scinto

[57] ABSTRACT

A method of making a spiral-wound tube, a tube made by such a method, and an outer layer used in such a tube includes structure and steps for bonding a regenerated cellulose web to an outer surface of a spiral-wound substrate. Preferably, the regenerated cellulose comprises a laminate of reverse-printed PVDC-cellophane bonded to a protective layer such as paper. The regenerate cellulose outer web has high strength, is substantially impermeable to liquid and air, has a low coefficient of friction, and is biodegradable. By reverse printing the regenerated cellulose web, printing inks are not smudged or transferred to other surfaces, thus providing an appealing and usable product.

19 Claims, 3 Drawing Sheets

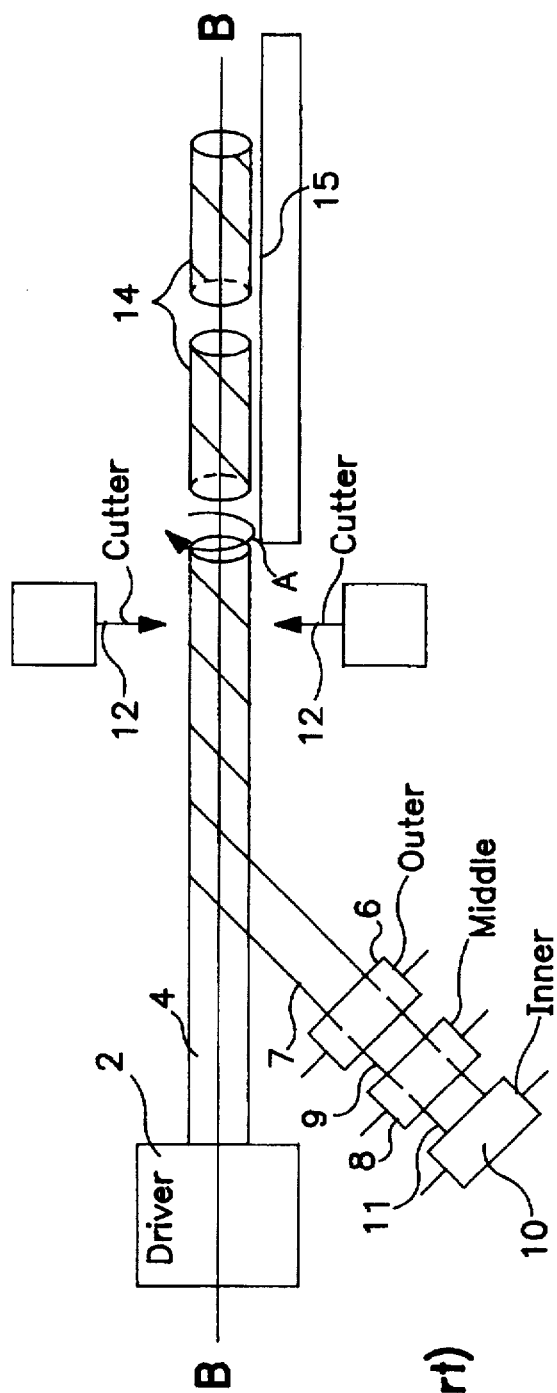
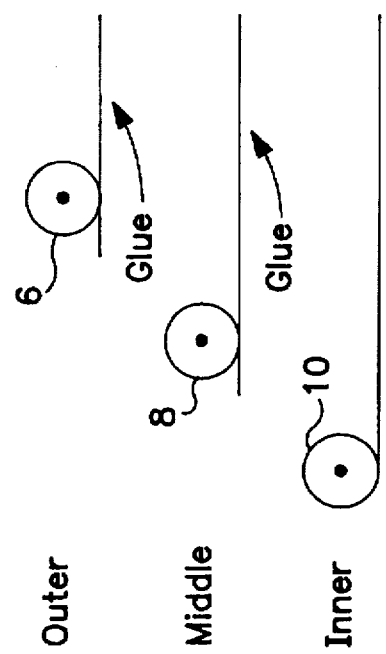
FIG. 1 (Prior Art)
FIG. 2 (Prior Art)

METHOD OF MAKING A SPIRAL-WOUND TUBE, A TUBE MADE BY SUCH A METHOD, AND AN OUTER LAYER USED IN SUCH A TUBE

BACKGROUND OF THE INVENTION

The present invention relates to a method for manufacturing spiral-wound tubes (such as tubes used to hold cookie dough, caulk, etc.), to a tube produced by such a method, and to an outer layer used in such a tube.

Spiral-wound cardboard tubes are well known for holding products such as cookie dough, biscuits, grease, caulk, frozen juice products, etc. Such tubes typically comprise (i) a thin inner layer of aluminum foil coated with a polymer, (ii) a middle layer of strong paper (e.g., Kraft paper), and (iii) a thin outer layer of paper often covered with aluminum foil. Conventionally, the outer layer has printing and/or labelling on an outside surface thereof, and a thin protective coating may be provided over the printing (see FIG. 3). For some products (such as caulk), however, the inner layer is not required.

Known spiral-wound tubes are produced according to the process depicted in FIG. 1 which is schematic in nature and not to scale. In FIG. 1, a driver 2 rotates a mandrel 4 in the direction of arrow A about longitudinal axis B. A roll 6 of outer layer material 7 in sheet or web form is fed to the mandrel 4 and is wrapped helically thereabout as the mandrel rotates in the direction A. Below and behind the roll 6, a roll 8 of the middle layer material 9 is also fed to the mandrel 4 underneath the outer sheet 7. A roll 10 of the inner layer web or sheet 11 is also fed to the mandrel and wrapped helically thereabout beneath the middle web. This produces a continuous three-layer spiral-wound hollow tube in hollow cylindrical form, which moves to the right in FIG. 1 as new tube is formed.

A cutter 12 is disposed near the end of the mandrel 4 and has a plurality of blades for cutting the circumference of the hollow tube in a radial direction in order to separate the tube into a plurality of individual containers or cans 14. The cans 14 are then transported via transportation machinery 15 (shown figuratively as rails) to a station for placing a bottom on each individual can. The cans are then gathered for shipment to a manufacturer who will insert a product in the can and place a top thereon.

FIG. 2 is a side view of the rolls in FIG. 1 and shows that a glue or other bonding/adhesive material is typically disposed between the respective, outer, middle, and inner webs so that they are bonded together when wrapped around the mandrel. Such conventional machinery can operate at 800 cans/minute, but is subject to line stoppages because the cut tubes 14 are in close contact as they are pushed along the rails of transportation machinery 15.

FIG. 3 depicts the structure of the tube layers described above, but it is not to scale. Inner web 11 comprises a polyolethelyne lower coating and an aluminum (e.g., aluminum foil) film. Middle web 9 is a thick, strong paper substrate such as Kraft paper, although materials such as plastic, composites, etc. may be used. The outer web 7 includes a lower paper substrate and an upper aluminum foil. The aluminum foil typically has printing (for labels, advertising, instructions, etc.) on an upper surface thereof, and a thin protective coating (e.g. 5–7 microns of polyacrylic) may cover the printing layer. The protective coating usually includes high slip additives applied to the outside sheet or label to try to overcome the scuffing and the rub-off of the printing which occurs when the tubes are manufactured, filled, transported, and purchased for home use.

A frequent problem in the manufacture of such spiral-wound tubes is that the friction between the outside of the tube and the transportation machinery rails can cause rubbing and binding of the tubes leading to line stoppage and/or dents and imperfections in a large lot of tubes. Since the walls of the tube are comparatively thin (e.g., 1 mm), and in many cases the diameter can be as high as 6 inches or 8 inches, a high proportion of spiral-wound tubes may be damaged during the tube-manufacturing process and/or cans will bind in the machinery leading to line stoppage and low yield.

Yet another problem caused by high friction between the tube and the transportation machinery rails is that high temperature will be generated on the outside of the tube. Since current outer layers (protective coating an/or a printing over aluminum foil) have low temperature stability, this may cause the outside protective coating (and even the printing label) to be rubbed off (scuffed off) onto the transportation machinery. Thus, if the outside protective coating has a coefficient of friction higher than about 0.18, frequent line stoppage, dented products, marked-up machinery, and low yields may result.

A further problem with known spiral-wound tubes is their low strength. For example, known filled cookie-dough cans frequently break when dropped or when brought to room temperature, whether during manufacturing, transportation, or even in the grocery store or home. This is because the inner and outer layers have very little tear resistance.

Furthermore, the predominant material used in the inner and outer layers of known cans is paper which is permeable to water, moisture, and gas. Often moisture and gas can seep into the can spoiling the product. Conversely, oils and proteins from the inside of the can may seep outward, causing spillage or an environmental problem. Often such seepage also stains the label, making it unappealing.

Moreover, in cases where an inner layer is not required (e.g. caulk), present cans are not easily biodegradable due to the aluminum foil used in the outer web.

What is needed is a spiral-wound tube having an outer web which is strong, moisture and gas impermeable, has a low coefficient of friction, has high strength, and is easy to adapt to an in-line manufacturing process.

SUMMARY OF THE INVENTION

The present invention is intended to overcome the defects in prior art spiral-wound tubes described above. The present invention relates to a regenerated cellulose outer web which is preferably transparent and reverse-printed so that printing inks are not present on the outside surface of the tube. Regenerated cellulose is strong, gas and moisture impermeable, has a low coefficient of friction, and the reverse printing prevents ink from being rubbed off on the transportation machinery or the consumer's hands. In addition, utilizing regenerated cellulose makes the tube biodegradable.

According to one aspect of the present invention, a spiral-wound tube includes a first spiral-wound substrate helically disposed in a cylindrical shape. A second spiral-wound substrate is helically disposed on an outer surface of the first substrate, the second substrate comprising regenerated cellulose.

According to another aspect of the present invention, a spiral-wound tube includes an inner paper web spiral-wound into a hollow cylindrical shape, and a first adhesive disposed outside of the inner paper web. An outer web is spiral-wound outside of the adhesive, and the outer web includes (i) an outer paper web disposed outside of the adhesive, (ii) a second adhesive disposed outside of the outer paper web, (iii) a marking disposed outside of the second adhesive, (iv) an inner coating disposed outside of the marking, (v) a regenerated cellulose sheet disposed outside of the inner coating, and (vi) an outer coating disposed outside of the cellulose sheet.

According to a further aspect of the present invention, a laminate for adhering to an outside surface of a spiral-wound substrate comprises an inner protective web having an inside surface adapted for accepting an adhesive for adhering the laminate to said spiral-wound substrate. A transparent regenerated cellulose web is adhered to an outside surface of the inner protective web, the transparent regenerated cellulose web having a longitudinal axis and an outside surface and an inside surface. The transparent regenerated cellulose web is substantially impermeable to air and water. A reverse-printed label is disposed on the inside surface of the transparent regenerated cellulose web and disposed at an obtuse angle with respect to the longitudinal axis of the transparent regenerated cellulose web.

According to a further aspect of the present invention, a method of making a spiral-wound tube comprises the steps of (i) feeding a first substrate to a rotating member so as to helically wrap the first substrate about the rotating member, (ii) feeding a regenerated cellulose substrate to the rotating member so as to helically wrap the second substrate about the rotating member on top of the first substrate, and (ii) adhering the second substrate to the first substrate.

According to yet a further aspect of the present invention, a method of making a laminate for adhering to an outside surface of a spiral-wound substrate comprises the steps of (i) reverse-printing an inside surface of a transparent regenerated cellulose web, the printing being disposed at an obtuse angle with respect to a longitudinal axis of the transparent regenerated cellulose web, the transparent regenerated cellulose web being substantially impermeable to air and water, and (ii) bonding an inner protective layer to the inside surface of said transparent regenerated cellulose web over said printing, an inside surface of the inner protective layer being adapted to accept an adhesive for adhering the laminate to the spiral-wound substrate.

BRIEF DESCRIPTION OF THE DRAWINGS

The advantageous features according to the present invention will be more readily understood from the following detailed description of the preferred embodiments when taken in conjunction with the drawings which show:

FIG. 1 is a schematic depiction of a method of making spiral-wound tubes;

FIG. 2 is a schematic depiction of gluing together the three layers used in prior-art spiral-wound tubes;

DETAILED DESCRIPTION OF THE PREFERRED EMBODIMENTS

The present invention provides a spiral-wound tube outer web which has high hardness and high strength, is substantially impermeable to gas and liquid, is biodegradable, has a low coefficient of friction, and excellent temperature stability. According to the present invention, a regenerated cellulose (e.g., cellophane) or nitrocellulose film is used in the outer layer in the spiral-wound tube. When combined with an appropriate middle layer (and for some products an appropriate inner layer), the combination including a regenerated cellulose outer layer provides a spiral-wound tube can that may be readily manufactured at reasonable cost yet with the improved properties relative to the prior art.

The regenerated cellulose web is preferably reverse-printed so that the label is on the inside surface of the outer layer. Of course, the middle and inner layers of the spiral-wound tube are not restricted to the known materials described above. For example, the middle and inner webs 9, 11 may be replaced with a single plastic web or a single paper web. The choice of the inner substrate(s) depends upon the material to be contained within the tube. Persons of ordinary skill in the packaging art readily understand the wide variety of materials which may be adapted as a substrate(s) inside of the outer web according to the present invention.

Figure 3:
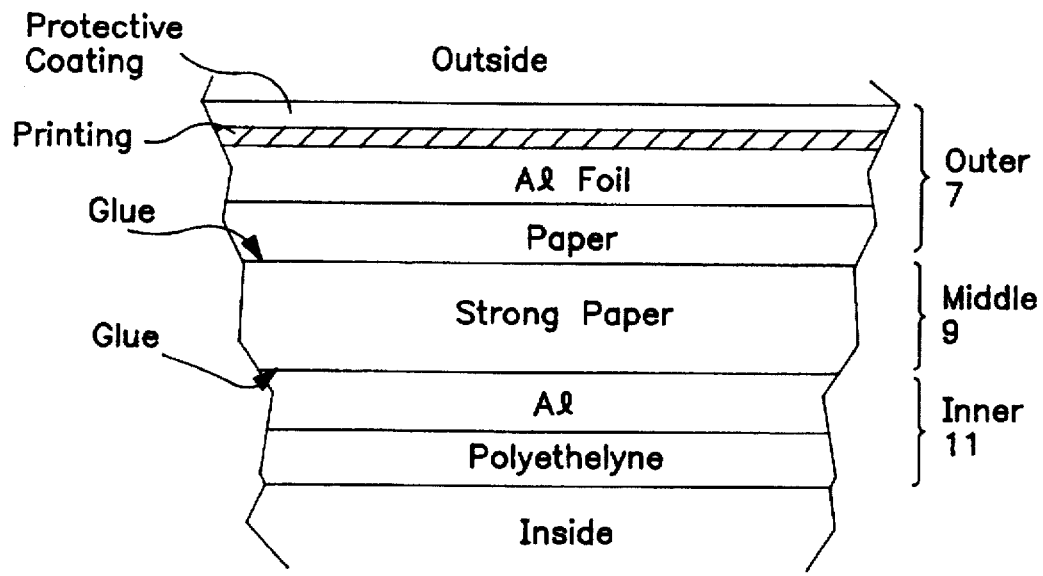
FIG. 3 is an exaggerated cross-section of the layers of prior art spiral-wound tubes.
Figure 4:
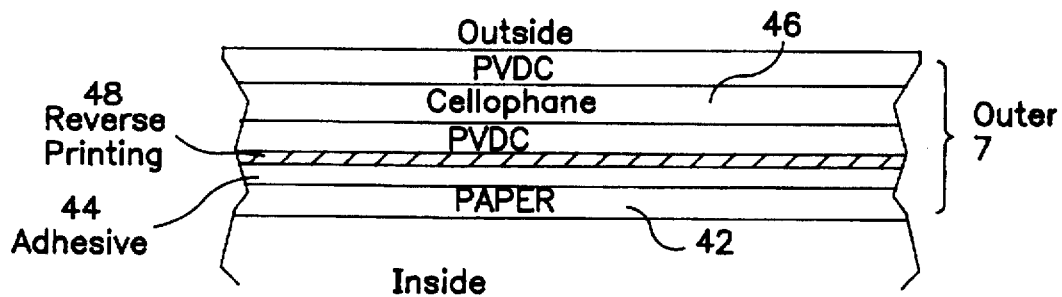
FIG. 4 is an exaggerated cross-section of the outer layer of a spiral-wound tube according to the present invention.

FIG. 4 is an exaggerated cross-section of one embodiment of outer web 6 according to the present invention, and is not to scale. In FIG. 4, the lower layer comprises a paper web 42 which is the layer to be adhered to the middle web 9. Preferably, paper layer 42 comprises a machine-glazed paper or some other paper specially adapted for holding glue or an adhesive to ensure a strong bond between the outer web 7 and the middle web 9. The paper layer 42 is between 20 to 50 grams/m$^2$ and may comprise machine glazed paper produced by Kimberly Clark Corporation, Dallas, Tex.

Above paper layer 42 is a solvent or water-based adhesive 44 which bonds the paper layer 42 to the regenerated cellulose web 46. The adhesive 44 may comprise a 5–8 micron layer of polyurethane or acrylic produced by Morton Chemical Co. of Chicago, Ill. or Zeneca Co. of Wilmington, Del.

The regenerated cellulose web 46 is typically coated on both surfaces thereof with a thin PVDC coating to enhance the impermeability and low coefficient of friction of the outer web 7.

The regenerated cellulose web 46 is preferably reversed-printed prior to bonding to the paper layer 42, so that the printing 48 lies between the adhesive 44 and the regenerated cellulose web 46. Since the reverse printing 48 is not exposed to the outside, the printing will not decay, smudge, or be transferred to another surface or material.

As an alternative to the embodiment depicted in FIG. 4, the paper layer 42 and adhesive 44 may be replaced with a coating such as a polymer-based coating such as polyurethane or acrylic coating. The coating is preferably 5–10 microns thick. This coating must also be specially treated or adapted to accept a glue or adhesive so that the outer web 7 may be easily bonded to the middle web 9. Of course, those of skill in the art will readily perceive that a wide variety of useful substrates may be bonded to the regenerated cellulose web 46, depending upon the product to be carried within the tube. So long as the substrate is bondable to the regenerated cellulose web 46, and is adapted to accept glue and adhesive for bonding to the middle web 9, such substrates may be useful in the present invention.

Yet another alternative to the embodiment of FIG. 4, the coated regenerated cellulose web 46 may be used as the outer web 7 without the addition of other paper or plastic substrates. In this instance, the web 46 would be treated with a substance, such as an adhesive, so that the web 46 readily adheres to the middle web 9.

Figure 5:
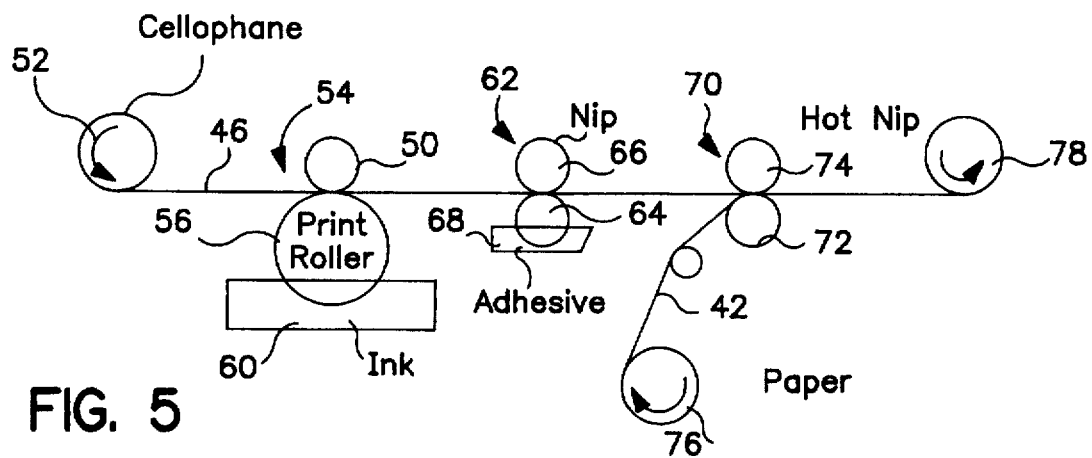
FIG. 5 is a schematic depiction of a process of making the outer web according to the present invention.

FIG. 5 is a schematic depiction of an in-line process for producing the outer web 7 according to one embodiment of the present invention. A roll 52 of cellophane 46 is fed to a printing station 54 comprising a print roller 56 and a nip roller 58. The print roller 56 sits in an ink bath 60 and carries ink from the bath to the bottom surface of the cellophane in a conventional printing operation. Typically, more than one printing station 54 will be provided to print a plurality of colors and images on the final product.

After the printing station(s), the cellophane is fed to an adhesive station 62 comprising an adhesion roller 64 and a nip roller 66. The adhesion roller 64 sits in an adhesive bath 68 and provides a uniform and thin (e.g., 1 mm) layer of adhesive 44 on the cellophane 46 over top of the printing 48.

After the adhesive is applied to the cellophane, the cellophane is fed to a lamination station 70 comprising hot nip rollers 72 and 74. Paper 42 from a paper roll 76 is fed into the lamination station 70 and is bonded therein to the cellophane at a temperature of 180° F. and a pressure of 80–200 psi. Of course, substrates other than paper may be used, as described above.

After the paper is bonded to the reverse-printed cellophane, the laminate is rolled into a roll 78 for transportation to the spiral-winding machinery depicted in FIG. 1. Alternatively, the in-line process of FIG. 5 could be joined to the in-line process of FIG. 1, if desired.

Figure 6:
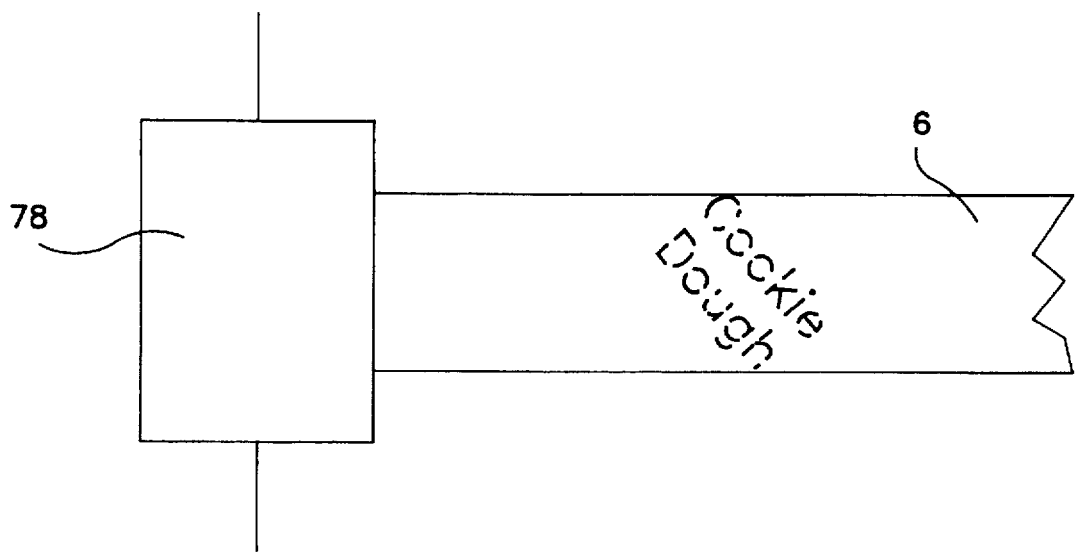
FIG. 6 is a schematic depiction of a roll of the laminated outer web according to the present invention.

FIG. 6 depicts the roll 78 of laminate according to the present invention and shows a reverse printed label which is printed at an obtuse angle (e.g., 1350) with respect to the longitudinal axis of the outer web 6. It can be readily perceived that upon spiral-winding of the outer web 6, the label will become substantially parallel to the longitudinal axis of the tube.

Since the outer web 6 according to the present invention utilizes a regenerated cellulose which has a very low coefficient of friction and high hardness, the transportation and handling in the spiral-winding process is greatly simplified and increases yield. Cut tubes will not bind on the manufacturing machinery. Consumers will appreciate a product wherein the contents of the can are insulated from the environment, and the can will not break when dented, dropped or slightly heated. The consumer will also appreciate that the can may be biodegradable because of the regenerated cellulose used in the outer web instead of aluminum foil.

Thus, what has been described is structure and steps for producing a spiral-wound tube, a method for making such a tube, and an outer layer useful in the tube.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A laminate for adhering to an outside surface of a spiral-wound substrate, comprising:

an inner protective web having an inside surface adapted for accepting an adhesive for adhering the laminate to said spiral-wound substrate;

a transparent regenerated cellulose web adhered to said adhesive layer of said inner protective web, said transparent regenerated cellulose web having a longitudinal axis and an outside surface and an inside surface, said transparent regenerated cellulose web being substantially impermeable to air and water, said transparent regenerated cellulose web comprising a cellophane sheet coated on both surfaces thereof with PVDC, and a reverse-printed label disposed on the inside surface of said transparent regenerated cellulose web and between said cellulose web and said inner protective web.

2. A laminate according to claim 1, wherein said reverse-printed label is disposed at an obtuse angle with respect to the longitudinal axis of said transparent regenerated cellulose web.

3. A laminate according to claim 1, wherein said inner protective web is a plastic coating.

4. A laminate according to claim 3, wherein said plastic coating comprises a polyurethane coating.

5. A laminate according to claim 3, wherein said plastic coating comprises an acrylic coating.

6. A laminate according to claim 1, wherein the inside surface of said inner protective web comprises a paper web.

7. A laminate according to claim 6, wherein said paper web comprises machine-glazed paper.

8. A laminate according to claim 1, wherein said adhesive layer comprises polyurethane.

9. A laminate according to claim 1, wherein said adhesive layer comprises an acrylic.

10. A laminate according to claim 1, wherein said adhesive layer is substantially 5–8 microns thick.

11. A methyl of making a laminate for adhering to an outside surface of a spiral-wound substrate, comprising the steps of:

reverse-printing an inside surface of a transparent regenerated cellulose web, the printing being disposed at an obtuse angle with respect to a longitudinal axis of said transparent regenerated cellulose web, said transparent regenerated cellulose web comprising a cellophane sheet coated on both surfaces thereof with PVDC and being substantially impermeable to air and water;

disposing an inner protective layer on the inside surface of said transparent regenerated cellulose web over said printing, an inside surface of said inner protective layer being adapted to accept an adhesive for adhering the laminate to the spiral-wound substrate; and adhering said inner protective layer to said inside surface of the transparent regenerated cellulose web.

12. A method according to claim 11, wherein said step of disposing comprises the step of using said adhesive layer to bond a paper inner protective layer to the inside surface of said transparent regenerated cellulose web over said printing.

13. A method according to claim 11, further comprising the step of bonding the reverse-printed transparent regenerated cellulose web to the inner protective layer with a hot nip.

14. A method according to claim 11, wherein said step of adhering comprises the step of adhering using a polyurethane layer.

15. A method according to claim 11, wherein said step of adhering comprises the step of adhering using an acrylic layer.

16. A method according to claim 11, wherein said step of disposing an inner protective layer includes the step of disposing a machine-glazed paper inner protective layer.

17. A method according to claim 11, wherein said step of disposing an inner protective layer includes the step of disposing a polyurethane inner protective layer.

18. A method according to claim 11, wherein said step of disposing an inner protective layer includes the step of disposing an acrylic inner protective layer.

19. A method according to claim 11, wherein said step of disposing an inner protective layer includes the step of disposing an inner protective layer 5–10 microns thick.

* * * * *

UNITED STATES PATENT AND TRADEMARK OFFICE
CERTIFICATE OF CORRECTION

PATENT NO. : 5,693,416

DATED : December 2, 1997

INVENTOR(S): JOSEPH KUCHEROVSKY

It is certified that error appears in the above-identified patent and that said Letters Patent is hereby corrected as shown below:

COLUMN 1

Line 46, "respective," should read --respective--;
Line 54, "polyolethelyne" should read --polyethylene--.

COLUMN 2

Line 15, "an/or" should read --and/or--.

COLUMN 6

Line 23, "methyl" should read --method--.

Signed and Sealed this

Nineteenth Day of May, 1998

Attest:

BRUCE LEHMAN

Attesting Officer

Commissioner of Patents and Trademarks